United States Patent [19]
Peters

[11] 3,971,719
[45] July 27, 1976

[54] THREE-PHASE SEPARATOR

[75] Inventor: Beldon A. Peters, Houston, Tex.

[73] Assignee: Exxon Production Research Company, Houston, Tex.

[22] Filed: Dec. 9, 1974

[21] Appl. No.: 530,585

[52] U.S. Cl.................................. 210/104; 210/114; 210/121; 210/540
[51] Int. Cl.² ........................................ B01D 15/24
[58] Field of Search .......... 210/104, 114, 110, 115, 210/121, 539, 540

[56] References Cited
UNITED STATES PATENTS

| | | | |
|---|---|---|---|
| 2,826,306 | 3/1958 | Burns | 210/115 X |
| 3,211,535 | 10/1965 | Hirahara | 210/114 X |
| 3,306,448 | 2/1967 | Baker | 210/121 |

*Primary Examiner*—John Adee
*Attorney, Agent, or Firm*—Robert L. Graham; Salvatore J. Casamassima

[57] ABSTRACT

A three-phase separator for processing produced fluids from an oil well is divided into an emulsion, an oil, and water compartments. The separator includes a water weir and controls for automatically adjusting the position of the water weir to maintain the oil-emulsion interface in the emulsion compartment substantially constant.

1 Claim, 4 Drawing Figures

THREE-PHASE SEPARATOR

BACKGROUND OF THE INVENTION

1. Field of the Invention

This invention relates to the separation of oil well fluids. In one aspect it relates to a three-phase separator.

2. Description of the Prior Art

Produced fluids from oil wells almost always include oil and gas and frequently include water. Surface facilities for handling such fluids generally include separators for isolating and segregating the three fluids. The three-phase separator is one type of separator used in oil and gas separation and offers the advantage that the complete fluid stream from the well may be handled by one vessel. If the separator functions properly, the oil and water and gas are separated, metered, and directed to their respective handling facilities. In the three-phase separator, the oil and water are normally collected in separate compartments and discharged through separate outlets to the handling and measuring facilities, and the gas is discharged into the gas gathering system. The three-phase separator may be employed to handle the total production from a particular lease or group of wells (i.e. production separator); or may be used to treat only a single well to determine the volume and fluid characteristics of the well (i.e. test separator).

The three-phase separator is particularly suited for test well applications since it permits metering each of the three streams discharging from the separator. The results of well tests are used to allocate production to a particular well. This data in turn is used as a basis for royalty payments, to determine performance of the reservoir and producing equipment and as a guide for implementing conservation measures to attain optimum production. In many states, well test data are used by regulatory agencies to set production allowables. It will be appreciated that the accuracy of well tests is of vital importance.

Test and production separators must be capable of handling a variety of producing conditions including large differences in flow rates, fluid densities, and relative amounts of oil, gas and water. All of these factors affect operation and accuracy of the three-phase separator. The problem of accuracy and operation will best be understood when considering the construction of a preferred type of three-phase separator. These separators are normally divided into four compartments, which will be referred to herein as the emulsion compartment, oil compartment, free-water compartment and water collecting compartment. A fixed bulkhead, referred to as the oil weir, separates the emulsion compartment and the oil compartment, and an adjustable bulkhead referred to as the water weir separates the free water compartment and the water collecting compartment.

Produced fluids from the well enter the separator at the emulsion compartment where gas separates from the liquid and is directed to the gas discharge valve. Free oil collects at the top of the emulsion compartment and free water gravitates to the bottom of that compartment. A horizontal transition zone, usually in the form of emulsion, separates the two free liquids in the emulsion compartment. The free oil spills over the fixed weir into the oil compartment while free water passes under the oil compartment into the free water compartment, and from there it spills over the water weir into the free water collecting compartment. It is thus seen that the relative elevations of the oil weir and the water weir must be properly adjusted to provide proper separation. If the water weir is too low in relation to the oil weir for a set of producing conditions, the emulsion can pass into the free water compartment and be discharged along with the free water. This not only affects the accuracy of the measurements but results in the loss of oil and fouls the water handling facilities. On the other hand, if the water weir is too high in relation to the oil weir, emulsion retention time within the emulsion compartment will be shortened and emulsion can enter the oil compartment.

For a given set of producing conditions, the proper relative elevations of the two weirs can be achieved with presented available separators. However, the producing conditions frequently are not known but are merely predicted. Moreover, such conditions change from day to day making it practically impossible for the operator to make the necessary adjustments with the presently available three-phase separators. If water is detected in the free oil or if oil is detected in the free water, the operator normally tries to correct these conditions by adding more emulsifying chemical. This results in an inefficient and expensive use of chemicals.

SUMMARY OF THE INVENTION

The purpose of the present invention is to provide a three-phase separator capable of automatically adjusting to variable producing conditions. The invention involves adjusting the height of the water weir to maintain the oil-water interface within the emulsion compartment substantially constant. It should be noted that the oil-water interface may be in the form of emulsified oil/free water interface or free oil/free water interface. The optimum interface level within the compartment is selected and maintained by detecting changes in the level of the interface and adjusting the water weir elevation accordingly. In one embodiment, a float control is positioned at the water-emulsion interface in the emulsion compartment and control means are provided to operate a motor which in turn determines and positions the water weir. In another embodiment, level controls are provided in the free-water compartment to maintain the level therein substantially constant. Thus a rise in the water level within the free water compartment will result in the water weir being lowered to permit increased water discharge and return the water level to its control position.

It will thus be appreciated that the adjustability of the water weir afforded by the present invention will enable the separator to accommodate a wide variety of flow conditions and fluid characteristics. Moreover, the separator will improve accuracy, save chemicals, and reduce maintenance.

DESCRIPTION OF THE PREFERRED EMBODIMENTS

As mentioned previously, the present invention may be employed in test separators as well as general production separators. The main difference between these two types of separators is size. Since the general production separator must handle the production of several wells, it is generally larger than the test well separator. The operation of the separators, however, is substantially identical. The present invention will be described in connection with a specific type of separator illustrated in FIG. 1 but it will be appreciated that the principle of automatically adjusting the water weir in response to level changes within the separator may be employed in other types of three-phase separators.

Figure 1:
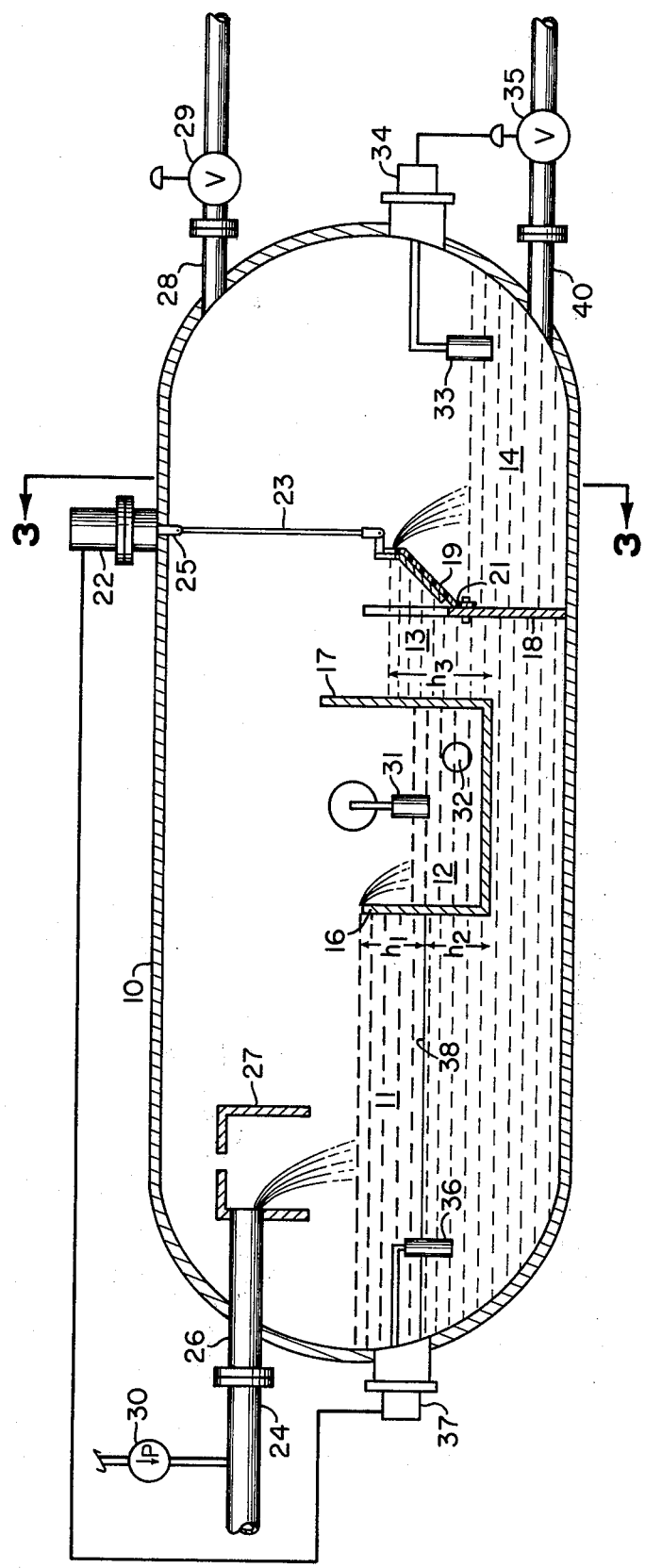
FIG. 1 is a longitudinal sectional view of a three-phase separator constructed according to one embodiment of the present invention.

As shown in FIG. 1, a horizontal longitudinal shell 10 is divided into an emulsion compartment 11, an oil compartment 12, a free water compartment 13 and water collection compartment 14.

The emulsion compartment 11 and the oil compartment 12 are separated by a bulkhead 16 which constitutes the fixed oil weir. The height of the emulsion compartment is equal to the height of oil weir 16.

The oil compartment 12 and free water compartment 13 are separated by baffle 17, which extends substantially above the elevation of fixed weir 16. Free water which gravitates within the chamber 11 passes under the oil compartment 12 and up into the free water compartment 13. Thus, as is apparent from the schematic of FIG. 1, the liquid within compartments 11 and 13 function as a U-tube. The level of the liquid within compartment 13 will be slightly lower than the liquid level within the compartment 11 because of the presence of oil in the latter, either as free oil or as emulsified oil. The free water compartment 13 and water collection compartment 14 are separated by a bulkhead 18. A water weir 19 is pivotally mounted to the bulkhead as at 21.

As will be described in more detail below, the water weir 19 is connected to a motor, e.g. pneumatic or electric motor 22, by rod 23. The motor 22 is mounted externally of the shell 10 and has a stem 25 extending through the shell 10. Opposite ends of rod 23 are connected to the weir 19 and stem 25, respectively.

Produced fluids will enter the vessel by means of line 24 which is connected to inlet nozzle 26. Produced fluids enter into a primary separating selection where gas and liquid are separated. The gas discharges at nozzle 28 through suitable back pressure control valve 29 into the gas gathering system, which will include suitable gas measuring facilities. Emulsifying chemical may be introduced into the fluid stream entering the separator by means of chemical pump 30.

The liquid from the primary separation section 27 gravitates and collects within compartment 11. Normally, a distinct water-emulsion interface will form within compartment 11. The size of the emulsion compartment is such to provide adequate resident times for the liquids so that free oil will float to the top and free water will gravitate to the bottom of the compartment 11. Free oil spills over weir 16 into compartment 12 where it is discharged through oil outlet nozzle 32.

Float 31 operates conventional liquid level controls to control the discharge of oil from compartment 12.

In accordance with one aspect of the present invention, a water-emulsion interface float 36 is provided within compartment 11. The float actuates liquid level controller 37 which in turn determines the position of the motor 22. The liquid level controller 37 and the motor 22 may be of conventional construction well known in the art. It may be a pneumatic or hydraulic positive displacement motor, or an electrical motor. Normally, the position of the stem 25 of motor 22 will be proportional to the signal sent by liquid level controller 37 such that changes of the interface level 31 will cause a proportional change in the elevation of water weir 19. For example, if produced water relative to produced oil is high, the increased water rate will raise the elevation of water in the free water compartment 13, which in turn will cause the water-emulsion interface 38 to rise within compartment 11 because of the U-tube effect. However, the condition is sensed by a float 36 causing a signal to be sent to motor 22 which in turn lowers the water weir 19 permitting water to pass into the water collecting compartment 14 at a higher rate.

Water is discharged from compartment 14 through water discharge outlet 40 into the water disposal facilities. Float 33 actuates liquid level controller 34 which in turn actuates water discharge value 35.

Figure 2:
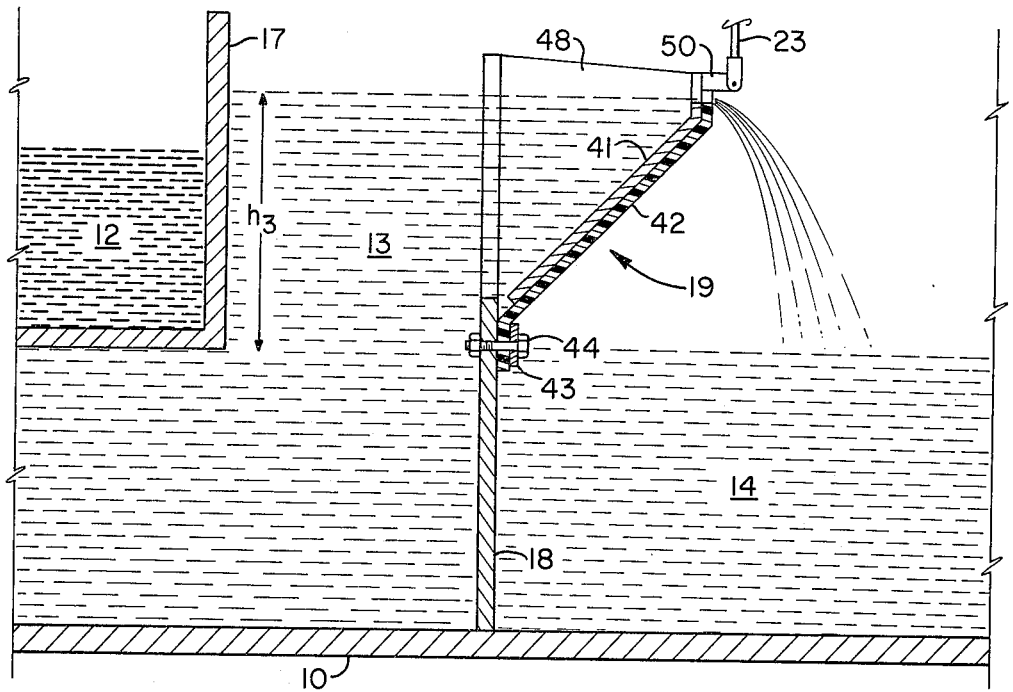
FIG. 2 is an enlarged fragmentary sectional view of a portion of the separator shown in FIG. 1, illustrating details of the water weir.
Figure 3:
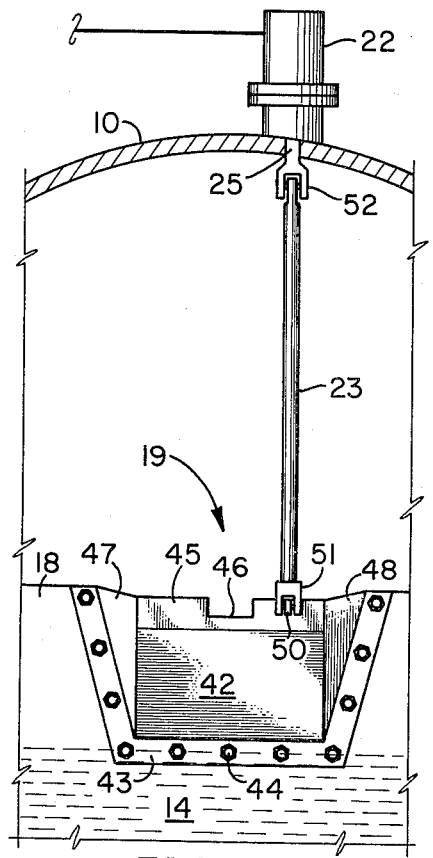
FIG. 3 is a transverse sectional view of the separator shown in FIG. 1, the cutting plane taken generally along line 3—3 thereof.

The construction of one form of the adjustable weir 19 as illustrated in FIGS. 2 and 3. It will be appreciated, however, that other forms may be equally serviceable. As illustrated, the water weir 19 includes a front plate 41 which has secured to its underside a flexible material such as an elastomer or plastic 42. The flexible material must be oil and salt water resistant. The flexible material 42 extends on either side of the plate 41 and forms triangular side walls 47 and 48 for the weir. Corrugated metal may also be used to provide side walls 47 and 48. The flexible material is secured to the bulkhead 18 along the bases of the side walls and plate 41. Bar 43 and nut and bolt assemblies 44 may be used to secure the flexible material to the bulkhead 18. It will be seen that this construction provides a fluid-tight seal across the weir and yet provides a flexible sidewall and a pivot axis to permit relative movement of the plate 41.

Figure 4:
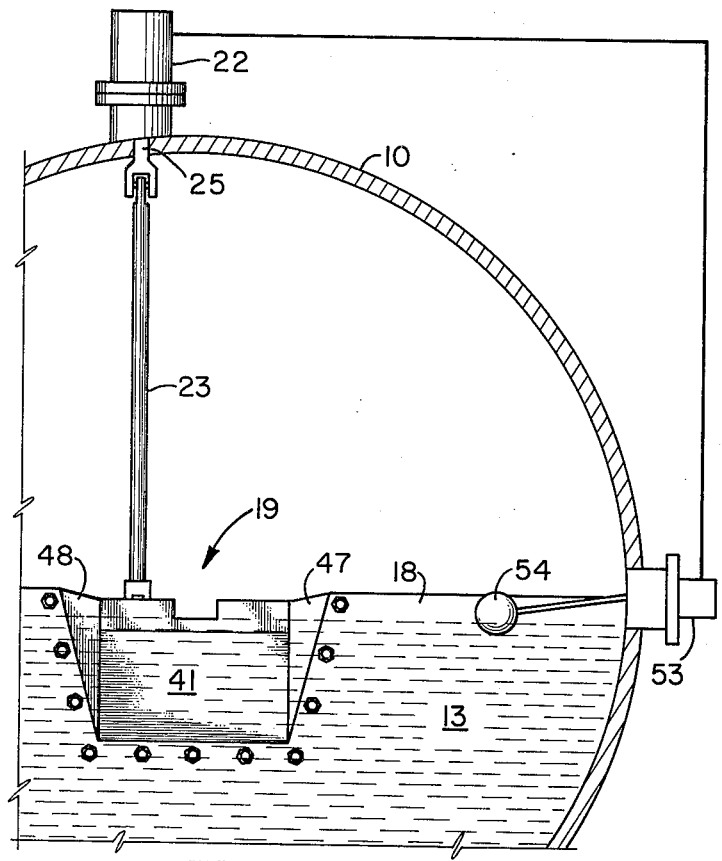
FIG. 4 is a transverse sectional view of a three-phase separator of another embodiment of the present invention illustrating details of the water weir and float controls as viewed from the water compartment.

The plate 41 has an upright section 45 which may be provided with a weir notch 46 as seen in FIGS. 3 and 4. One useful weir construction is a steel plate having nitrile rubber bonded to its underside. However, other weir construction such as rigid plastic with flexible side walls and a pivot axis, may also be employed.

Extending from one edge of the plate 41 is a tab 50 which provides a means for connection to rod 23. The connections at either end of the rod 23 should be sufficient to permit swinging movement of the plate. Clevises 51 and 52 may be used for this purpose.

The installing the system, the interface float 36 will be positioned to maintain the interface control point at approximately 1/2 the vertical dimension of the fixed weir 16 such that $h_1$ equals $h_2$. (See FIG. 1) Weir 19 projects into compartment 14 and is initially positioned at about the midpoint of the upper and lower limits of the anticipated water levels within the compartment 13. The clevises on rod 23 may be adjusted to attain the proper weir position. Additional adjustments as required by the production volumes or characteristics may be made on the float controls and motor 22. Under normal conditions, rod 23 should have a stroke of about 10 inches for large production separators and about 4 inches for small test separators.

Following proper adjustment of the controls, the separator thereafter should be capable of operation without further attendance or adjustment under normal operating conditions.

Another embodiment of the invention is illustrated in FIG. 4 wherein the separator is provided with a level control within the freewater compartment 13. In this embodiment, a float 54 senses the level within the chamber 13 and actuates a liquid level controller 58 which in turn delivers a signal to motor 22. It should be noted that corresponding parts in FIG. 4 and the previous drawings are indicated by like reference numerals. The control point within compartment 13 may be adjusted by adjusting the clevises 51 and 52, or the liquid level controls 53 and 54. It should be observed that a float within compartment 13 may be connected directed to the weir 19 such that increases in elevation causes the weir to go down and lowering the elevation causes the weir to go up.

In both embodiments of the invention described herein, increased water production will be reflected by a tendency of the level $h_3$ within compartment 13 (see FIG. 1) to rise which if not corrected could result in the interface level 38 also rising because of the U-tube effect. However, this condition is sensed by the float 54 (See FIG. 4) which sends a signal to motor 22 adjusting the weir 19 downwardly returning the liquid level $h_3$ to the control position.

The following illustrates one specific design of a three-phase separator equipped with a self-adjusting water weir according to the embodiment of the present invention illustrated in FIG. 1:

| Shell (10) | diameter | 4 feet |
| --- | --- | --- |
| | length | 16 feet |
| Float (36) and LLC (37) | type | Interface Level Controller sold as NORRISEAL SERIES 1001 by W. C. Norris Co. |
| Motor (22) | type | Double Acting Pneumatic Cylinder sold as HANNA MODEL T753 by Rex Chain Belt Co. |
| Oil Weir (16) | | |
| $h_1$ | | 9 inches |
| $h_2$ | | 9 inches |
| Water Weir (19) range in elevation | | 4 inches |

It will be apparent to those skilled in the art that numerous equipment designs are possible to achieve the operational principle of the present invention.

I claim:

1. In a three-phase oil field separator which includes an emulsion compartment and an oil compartment separated by an oil weir and a water compartment and a water collection compartment separated by a water bulkhead, the improvement comprising a water weir movably mounted on said bulkhead, liquid level control means automatically responsive to changes in the height of the oil-water interface in said emulsion compartment, and means for raising said water weir attendant to a decrease in the height of said oil-water interface and for lowering said water weir attendant to an increase in the height of said oil-water interface, said means being responsive to said liquid level control means so that the height of the oil-water interface is maintained substantially constant.

2. The invention as defined in claim 1 wherein said liquid level control means includes an oil-water interface float mounted in said emulsion compartment.

3. The invention as defined in claim 1 wherein said liquid level control means includes a water float mounted in said water compartment.

4. A three-phase oil field separator which comprises:
a horizontal shell;
a fixed weir dividing interior portion of said shell into an emulsion compartment and an oil compartment;
a bulkhead dividing another interior portion of said shell into a free-water compartment and water collection compartment;
a water weir movably mounted on said bulkhead;
a motor mounted on said shell for positioning the height of said water weir; and
liquid level control means for detecting changes in the height of oil-water interface within said emulsion compartment and sending a signal to said motor indicative of said changes, said motor in response to said signal being operative to raise said water weir attendant to a decrease in height of said oil-water interface and to lower said water weir attendant to an increase in the height of said oil-water interface so that the height of the oil-water interface is maintained substantially constant.

5. A three-phase oil field separator which comprises:
a horizontal shell;
a fixed weir dividing interior portion of said shell into an emulsion compartment and an oil compartment;
a bulkhead dividing another interior portion of said shell into a free-water compartment and a water collection compartment;
a water weir movably mounted on said bulkhead;
liquid level control means for detecting the liquid level in the free-water compartment; and
means for raising said water weir attendant to decrease in the height of said oil-water interface and for lowering said water weir attendant to an increase in the height of said oil-water interface, said means being responsive to said liquid level control means to maintain the liquid level within said free water compartment substantially constant.

* * * * *